United States Patent Office 2,727,018
Patented Dec. 13, 1955

2,727,018

REACTION OF A MERCAPTO POLYMER WITH AN N-ACYL LACTAM OF A POLYCARBOXYLIC ACID

Robert D. Evans, Greenwich, Conn., and Milton J. Rhoad, Akron, Ohio, assignors, by mesne assignments, to The Goodyear Tire & Rubber Company, a corporation of Ohio No Drawing. Application September 11, 1952, Serial No. 309,134

3 Claims. (Cl. 260—78.4)

This invention relates to the preparation of sulfur-containing polymers and more particularly to the preparation of polythioesters by coupling or interlinking polymers of lower molecular weight by means of a particular type of interlinking agent.

Methods for preparing polyesters from polyhydroxy compounds are not generally applicable to the preparation of polythioesters from polymercapto compounds, particularly when polymers of high molecular weight are desired. One method for preparing linear polythioesters is described in U. S. Patent 2,510,567, according to which dimercaptans and dibasic acid chlorides are condensed, with the elimination of hydrogen chloride. In that method, it is sometimes difficult to remove all of the hydrogen chloride, particularly in the later stages of the invention. Residual hydrogen chloride can affect the color and stability of the polymer.

The present invention provides a means of producing polymers containing thioester linkages without the production of by-product hydrogen chloride.

According to the practice of the invention, a mercapto polymer is treated with an interlinking agent which is an N-acyl polylactam of a polycarboxylic acid, each of the carbonyl groups of the acyl radical being attached to the nitrogen atom of a lactam radical. This class of compounds is described in U. S. Patent 2,303,177 to Schlack. The polymer can contain a plurality of mercapto radicals and, if desired, can also contain hydroxyl and/or amino radicals, which can also react with the interlinking agents. Amino radicals must contain a reactive hydrogen atom in order to enter into the interlinking process and are preferably primary amino. If the intermediate polymer contains only two reactive groups per molecule and the interlinking agent is bifunctional, the resulting high polymer will be linear, and hence thermoplastic. Cross-linked polymers are prepared by the use of a polymer and interlinking agent, one or both of which have more than two reactive groups.

The N-acyl polylactams, when derived from dicarboxylic acids, may be called N-acyl bis lactams and may be represented by the structural formula

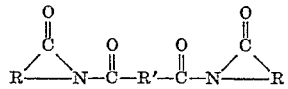

in which

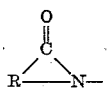

is a lactam radical and

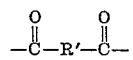

is a diacyl radical. More broadly, when the polycarboxylic acid has $x$ carboxyl groups, the products may be represented by the structural formula

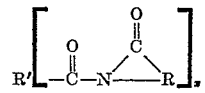

or

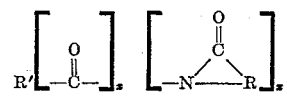

in which

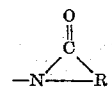

is a lactam radical and

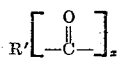

is a polyacyl radical and $x$ is 2 or more.

The polylactam interlinking agents can be prepared by condensing a lactam with the polyacyl chloride or polyacyl bromide of a polycarboxylic acid, the lactam being used in such proportions as to replace each of the halogens in the acyl halide. The reaction may be illustrated by the following equation, employing epsilon caprolactam and terephthaloyl chloride as representative reactants:

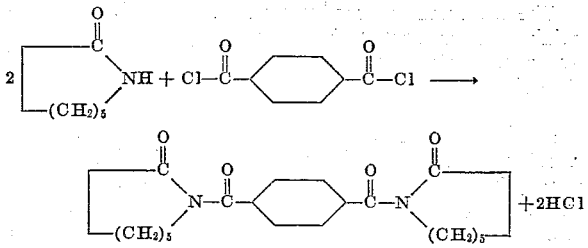

The preparation of such compounds is illustrated by the following representative example.

Example A

To a solution of 22.6 grams (0.20 mol) of epsilon caprolactam in 200 cubic centimeters of dioxane were added a solution of 20.8 grams (0.102 mol) of terephthaloyl chloride in 100 cubic centimeters of dioxane and a solution of 20.2 grams (0.20 mol) of triethylamine in 50 cubic centimeters of dioxane. After these additions had been completed, the mixture was heated at 100° C. for 4 hours. It was then cooled and the triethylammonium chloride was filtered off. Concentration of the filtrate yielded a brown oil which on treatment with a mixture of ethyl acetate and hexane yielded a solid precipitate. After extraction with ethyl acetate, the precipitate was recrystallized from alcohol. The product, N,N'-terephthaloyl bis caprolactam, having the formula

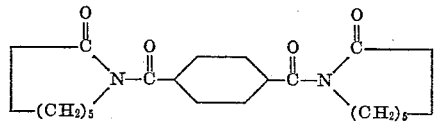

melted at 191–193° C. The calculated analysis for this compound is carbon-67.42%, hydrogen-6.74%. The values found by actual analysis were carbon-67.01%, hydrogen-6.84%.

Further examples of N-acyl polylactams are N,N'-isophthaloyl bis epsilon caprolactam, N,N'-adipyl bis epsilon caprolactam, N,N'-adipyl bis valerolactam, N,N'-isophthaloyl bis valerolactam, N,N'-isophthaloyl bis butyrolactam, N,N'-terephthaloyl bis butyrolactam, N,N'-

2,5-dichloroterephthaloyl bis caprolactam, N,N',N''-trimesyl tris epsilon caprolactam, the tetra valerolactam of 1,4,5,8-naphthalene tetracarboxylic acid, the tetra epsilon caprolactam of cyclohexanonetetrapropionic acid, the octa epsilon caprolactam of dicyclohexanoneoctapropionic acid and the polycaprolactam of polyacrylic acid.

The interlinking reaction may proceed according to either or both of the following illustrative equations, in which N,N'-terephthaloyl bis caprolactam is shown as a typical N-acyl polylactam of a polycarboxylic acid.

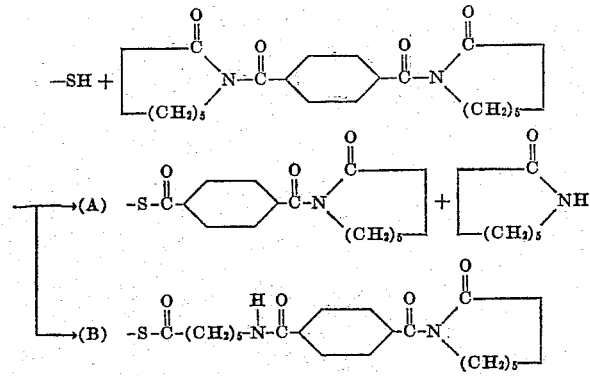

The mechanism of the reaction is not known for certain and it is possible that both of the indicated types of reaction occur. In the equations, reaction has been shown on only one end of the polylactam. Similar reaction can and, in practice, does take place on both ends of the molecule.

The invention is broadly applicable to polymers containing one or more sulfhydryl groups. Thus the various superpolymeric polymethylene dithioterephthalates and dithioisophthalates derived from polymethylene dithiols containing from two to ten methylene groups, including the ethylene, trimethylene, tetramethylene, pentamethylene, hexamethylene and decamethylene polythioesters and copolythioesters, are easily prepared by this method. Also, similar polythioesters derived from branched chain dithiols or dithiols containing either oxygen or sulfur atoms as integral parts of the chain separating the two mercapto groups can be readily prepared by this method. Other useful polythioesters are those derived from the various polymethylene dithiols containing from two to ten carbon atoms and acids such as diphenoxyethane-4,4'-dicarboxylic acid, diphenoxypropane-4,4'-dicarboxylic acid, diphenoxybutane-4,4'-dicarboxylic acid, diphenoxypentane-4,4'-dicarboxylic acid, diphenoxyhexane-4,4'-dicarboxylic acid, diphenylmethane-4,4'-dicarboxylic acid, diphenylbutane-4,4'-dicarboxylic acid, naphthalene-1,5-dicarboxylic acid, naphthalene-2,6-dicarboxylic acid, naphthalene-2,7-dicarboxylic acid, 1,4-diphenoxybenzene-4',4''-dicarboxylic acid, 1,4-bis-(phenoxymethyl)benzene-4',4''-dicarboxylic acid, phenoxybenzene-4,4'-dicarboxylic acid, diphenylthioether-4,4'-dicarboxylic acid and diphenyl-4,4'-dicarboxylic acid.

A particularly important and valuable application of the invention is in the production of linear polymers of high molecular weight. According to the present invention, a polythioester of low or moderate weight having mercapto end-groups can be converted within a relatively short period of time to a polymer of high molecular weight. Polymers having a mercapto group on one end and a hydroxyl or amino group on the other end can also be used.

Various methods are available for preparing low polymers containing mercapto groups. For example, a dicarboxylic acid chloride can be reacted with more than an equivalent proportion of a dimercaptan or mercaptoalcohol. Small excesses produce larger polymer molecules while large excesses produce smaller molecules. The particular method for forming the "intermediate" mercapto polymer is not part of the present invention, which is directed to the interlinking of such polymers, however formed.

In order to produce polymers of high molecular weight or superpolymers, the number of mercapto, hydroxyl and amino groups and the acylating groups arising from the N-acyl polylactam interlinking agent must be approximately equal. When the functionality of the intermediate polyester is the same as that of the polylactam, as in the preparation of linear polymers, this will involve equimolecular proportions. If the average molecular weight of the "intermediate" polymer and the number of mercapto, hydroxyl and amino groups per molecule are known, the approximate amount of interlinking agent can be calculated. In practice, however, it is frequently desirable to establish the optimum amount of interlinking agent by empirical methods. Because of the difference in size of the molecules of "intermediate" polymer and interlinking agent, the proportion by weight of the interlinking agent will be relatively small.

The interlinking agent may be charged into a reactor containing well-stirred molten polymer and the reaction continued at temperatures above the melting point of the polymer. After the initial reactions have been completed, the liberated lactam may be removed under reduced pressure and the resultant superpolymer removed by any suitable means. Alternatively, the interlinking agent may be added portionwise with complete reaction before the next addition. In this method, the addition of an amount of N-acyl polylactam in excess of the calculated amount will not be harmful providing the molecular weight of the polymer at the end of the previous reaction period was sufficiently high to give the desired properties. An excellent method of carrying out the reaction is to add the N-acyl polylactam or its solution to a solution of the polymer in a nonreactive solvent. Under these conditions, thorough mixing is assured. The reaction can be completed at an elevated temperature. The polymer may be recovered either by distillation of the solvent or by precipitation of the polymer in a nonsolvent.

Cross-linked polymers having properties similar to those of a vulcanized rubber or a gelled or thermoset resin can be prepared by the process of the invention when either or both the N-acyl polylactam and the "intermediate" polymer contain more than two functional groups. For example, such products result when a linear polythioester having mercapto end groups is treated with an N-acyl polylactam compound having three or more lactam groups per molecule. Another method for preparing cross-linked or network polymers is by reacting a nonlinear polythioester containing more than two mercapto groups per molecule with an N-acyl polylactam containing at least two lactam groups per molecule.

Thus, the invention includes the conversion of thermoplastic polymers having a mercapto group and at least one radical selected from the group consisting of mercapto, hydroxyl and amino groups per molecule to "vulcanized" or thermoset compositions through treatment with polylactam compounds as described above. If the initial polymer molecules contain only two reactive groups per molecule, as in the case of linear polymers terminated with mercapto groups, a polylactam compound containing at least three lactam groups must be used in order to achieve cross-linking. If the number of available mercapto, hydroxyl and amino groups per molecule is three or greater, either the bis- or higher polylactam compounds may be used.

The practice of the invention is illustrated by the following representative example.

*Example 1*

A low molecular weight pentamethylene dithiolsebacate polymer was prepared by reacting 2.943 grams of pentamethylene dithiol (0.0216 mol) with 4.777 grams of sebacyl chloride (0.0199 mol). The reaction was carried out in o-dichlorobenzene solution with nitrogen stirring for 2½ hours at about 76° C. and then at reflux for 2½ hours. After standing overnight, the solvent was distilled off and the residual melt was heated in vacuo at about 197° C. for half an hour. The resultant polymer had a melt viscosity of 4.31 poises at 197° C. A 2% loss of mercaptan during polymerization was assumed due to volatilization. Thus the residual excess of mercapto groups in the polymer was 0.0013 mol or 0.0026 equivalents. The total weight of polymer was 6.020 grams [(0.0199) (302)], where 0.0199 is the mols of non-volatile acid chloride and 302 is the weight of the polymer unit. Thus the mols of excess mercapto groups per gram of polymer equals $$\frac{0.0013}{6.020}$$

or 0.0002. On the basis of these calculations, 4.137 grams of low molecular weight polymer containing 0.00084 mol of reactive mercapto groups and 0.315 gram of terephthaloyl-bis-N-caprolactam (mol. weight=356) were heated at about 197° C. with nitrogen stirring. After two hours, the polymer had a melt viscosity of 1105 poises at 197° C.

While certain representative embodiments and details have been shown for the purpose of illustrating the invention, it will be apparent to those skilled in this art that various changes and modifications may be made therein without departing from the spirit or scope of the invention.

We claim:

1. A method for increasing the molecular weight of a linear polythio ester having mercapto end groups which comprises reacting said polythio ester with a polylactam in which at least two lactam radicals are linked through their nitrogen atoms by an acyl radical of a polycarboxylic acid, each of the carbonyl groups of the acyl radical being thus attached to a lactam radical and said polylactam being free from reactive substituents.

2. A method according to claim 1 in which the polylactam is used in amount equivalent to the mercapto groups in the polythio ester.

3. A method according to claim 2 in which the polylactam is an N,N'-acyl bis lactam of a dicarboxylic acid.

References Cited in the file of this patent

UNITED STATES PATENTS

| 2,216,044 | Patrick | Sept. 24, 1940 |
| 2,303,177 | Schlack | Nov. 24, 1942 |

FOREIGN PATENTS

| 57,731 | Holland | June 15, 1946 |